No. 740,303. PATENTED SEPT. 29, 1903.
I. S. McDOUGALL.
APPARATUS FOR HEATING AND MOISTENING AIR.
APPLICATION FILED JAN. 19, 1903.
NO MODEL. 4 SHEETS—SHEET 1.

attest:
C. P. Middleton
V. C. Durand

Inventor.
Isaac S. McDougall
by Ellis Spear & Company
Atty's

No. 740,303. PATENTED SEPT. 29, 1903.
I. S. McDOUGALL.
APPARATUS FOR HEATING AND MOISTENING AIR.
APPLICATION FILED JAN. 19, 1903.
NO MODEL. 4 SHEETS—SHEET 2.

Attest:
C. Middleton
R. C. Durand

Inventor,
Isaac S. McDougall.
by Ellis Spear & Company
Atty's

No. 740,303. PATENTED SEPT. 29, 1903.
I. S. McDOUGALL.
APPARATUS FOR HEATING AND MOISTENING AIR.
APPLICATION FILED JAN. 19, 1903.
NO MODEL. 4 SHEETS—SHEET 3.

Attest:
C. Masterton
R. C. Durand

Inventor,
Isaac S. McDougall
by Ellis Spear & Company
Attys.

No. 740,303. PATENTED SEPT. 29, 1903.
I. S. McDOUGALL.
APPARATUS FOR HEATING AND MOISTENING AIR.
APPLICATION FILED JAN. 19, 1903.
NO MODEL. 4 SHEETS—SHEET 4.

Attest:

Inventor.
Isaac S. McDougall.
by Ellis Spear & Company
Attys.

No. 740,303.          Patented September 29, 1903.

UNITED STATES PATENT OFFICE.

ISAAC SHIMWELL McDOUGALL, OF MANCHESTER, ENGLAND.

APPARATUS FOR HEATING AND MOISTENING AIR.

SPECIFICATION forming part of Letters Patent No. 740,303, dated September 29, 1903.

Original application filed December 28, 1901, Serial No. 87,633. Divided and this application filed January 19, 1903. Serial No. 139,648. (No model.)

*To all whom it may concern:*

Be it known that I, ISAAC SHIMWELL MCDOUGALL, engineer, residing at 68 Port street, Manchester, in the county of Lancaster, England, a subject of the King of Great Britain and Ireland, have invented certain new and useful Improvements in Apparatus for Heating and Moistening Air, (for which I have made application for Letters Patent in Great Britain, No. 13,152, June 27, 1901,) of which the following is a specification.

This invention relates to the heating and moistening of air, which air is drawn through the apparatus owing to the heat imparted to it by the apparatus without the use of fans or air-propellers and is a division from my original application, Serial No. 87,633, filed December 28, 1901.

My invention consists in an apparatus which will be fully described in the specification and its novel features pointed out in the claims.

Figure 1:
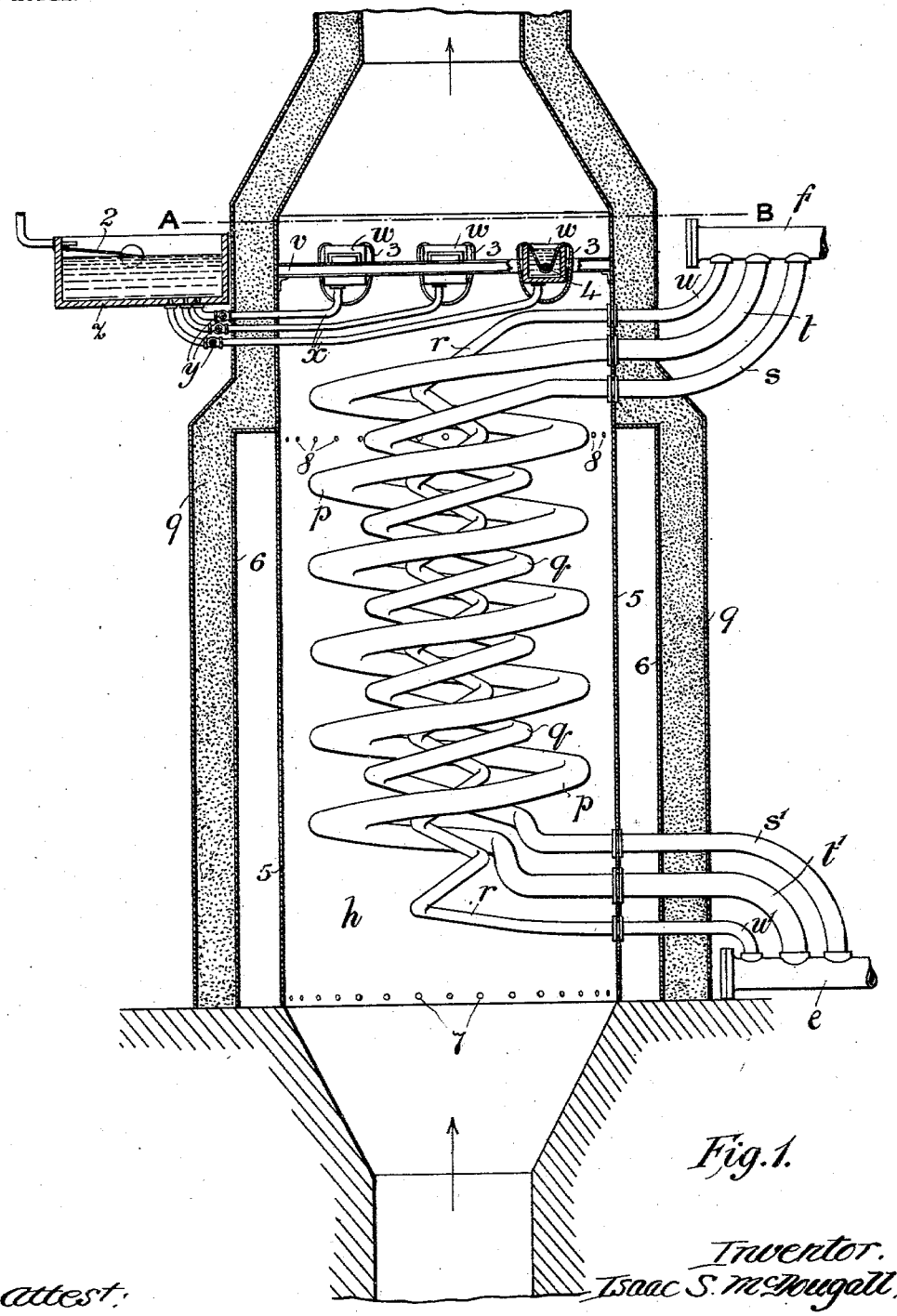
Figure 2:
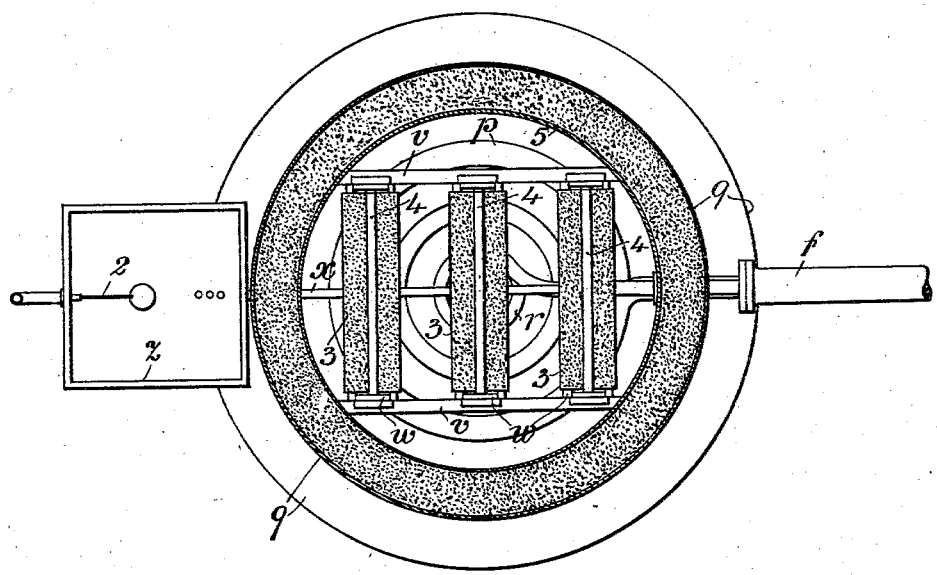
Figure 3:
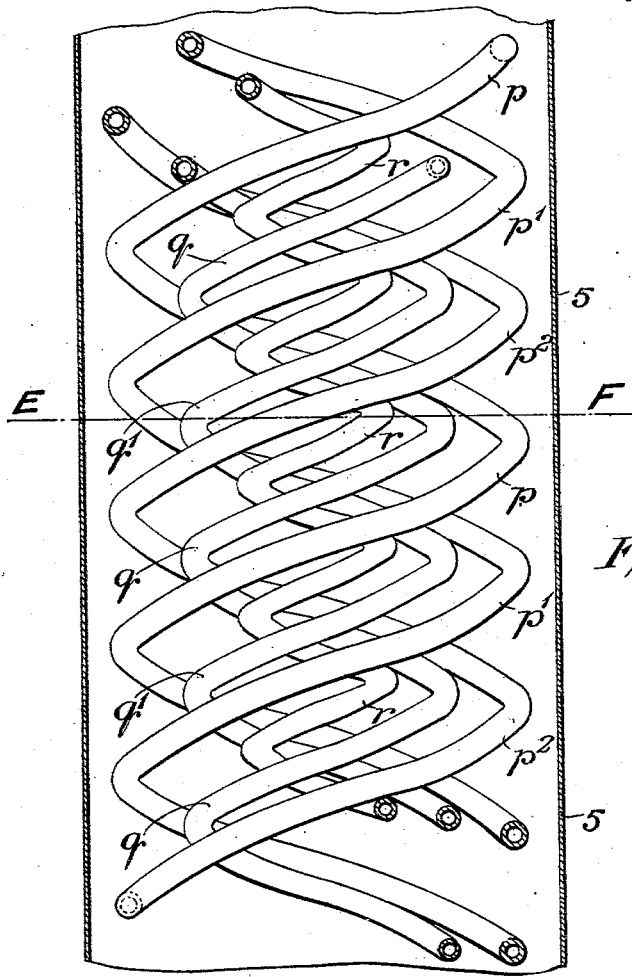
Figure 4:
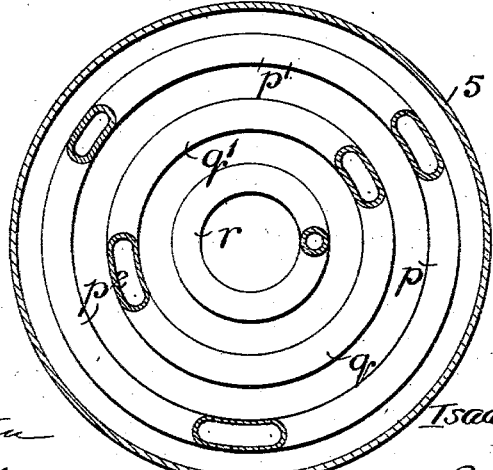
Figure 5:
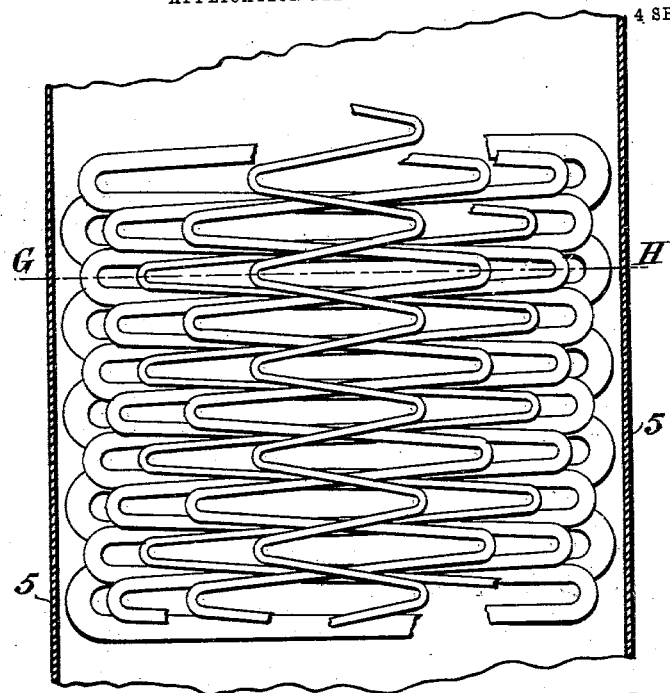
Figure 6:
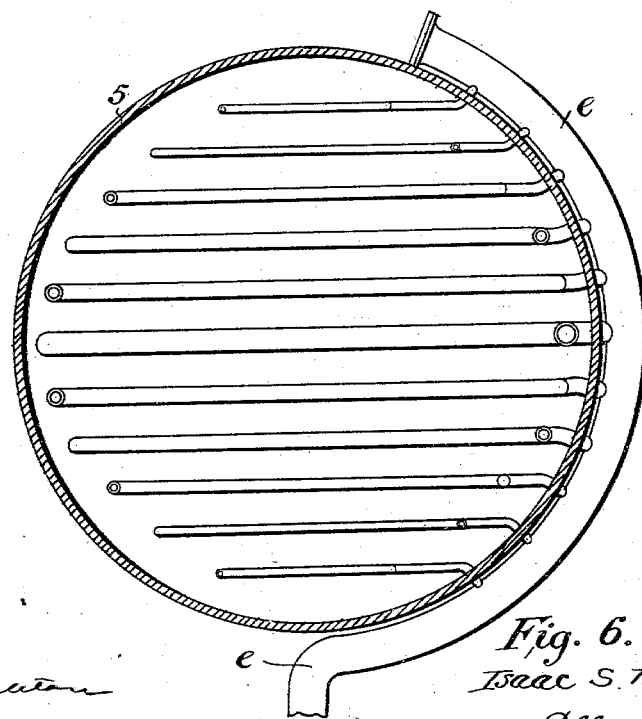

Referring to the accompanying drawings, which illustrate my invention, Figure 1 is a section of an air-heating chamber constructed according to my invention. Fig. 2 is a horizontal section on the line A B of Fig. 1. Fig. 3 is a vertical section through an air-heating chamber similar to that shown in Figs. 1 and 2, but having a modified arrangement of heating-coils. Fig. 4 is a section on the line E F of Fig. 3. Fig. 5 is a vertical section through an air-heating chamber, showing another modified arrangement of coils. Fig. 6 is a section on the line G H of Fig. 5.

Referring in the first place to Fig. 1, the air-heating chamber $h$ contains coils of pipe $p\ q\ r$, arranged in three spirals or helices. The upper ends of these helices of pipe are connected, by means of the coupling-pieces $s\ t\ u$, with the pipe $f$, which leads from a water-heater which is of sufficient capacity to supply the requisite quantity of water to the coils. The lower ends of the coils are connected, by means of the coupling-pieces $s'\ t'\ u'$, with the pipe $e$, which is adapted to convey the water back to the water-heater. The outer coil $p$ is made of larger section than the intermediate coil $q$, and this again is made of larger section than the inner coil $r$. The reason for making the coils of different section is to allow the water in all of them to be equally cooled in its passage through them. The water rises up from the water-heater by the pipe $f$, passes downward through all the coils in parallel, and returns to the water-heater by the pipe $e$. The air enters the heating-chamber at the bottom and passes around and through between the coils, leaving the chamber at the top. If the coils had been of equal section and of equal pitch, the outer one, owing to its greater length, would have had more cooling-surface for the water it contained or greater heating-surface for the air which impinged on its exterior. By making the coils of different section I obtain an equal amount of superficial area in each for each cubic foot of water passing through it, while constructing the coils of equal or nearly equal pitch of convolutions. By this means each coil can do an equal amount of work in heating the air, and the length of the whole arrangement of coils is designed to give the fall of temperature which is found to be best. As I employ no steam in the heating-coils, but only hot water, and as this water is only at a low pressure, it will be evident that this device for insuring that the water shall fall in temperature the same amount in passing through all the coils is most important and most valuable, for if one coil gets cooled too much its lower end will not be effective in heating the air, while if it does not get cooled enough a greater amount of heat than is necessary is returned to the water-heater. At the upper end of the air-heating chamber I provide tanks $w$, which are supported on beams $v$, extending across the top of the air-heating chamber. The tanks are connected by pipes $x$, provided with cocks $y$, with a cistern $z$, containing water. A float-valve 2 or other automatic valve is provided for the purpose of maintaining the water-level constant in the cistern. When the cocks $y$ are open, as they are normally, the water will stand at the same height in the tanks $w$ as in the cistern $z$. Pieces of fibrous material 3 are allowed to dip into the tanks and then pass over their sides and to hang down around the tanks. Water saturates the fibrous material by capillary action, and thus a large amount of wet surface is exposed to the hot air as it leaves the air-heating chamber. The heated air is in a condition to take up moisture and obtains this from the wet surface of the fibrous material. The material is preferably formed in endless bands, the width of each band being that of the length of the tank which it envelops. The material passes below bars 4, which extend the length of the tanks and below the level of the water in them. These bars can be arranged to pass below snugs or catches in the ends of the tanks, so that they can be withdrawn when desired. The tanks preferably only rest on the beams $v$ and are not fastened down to them, so that any tank can be lifted away when desired. The air in the heating-chamber and the duct or ducts above it will be lighter than the air outside, and a current will therefore be induced through the air-heating chamber in a manner that is well understood. The arrangement of coils in the chamber is such as to impede the passage of the air very little. As the air does not require to pass through the saturated fibrous material, but only pass around it, no resistance is offered to the passage of the air.

It will be evident on disconnecting the coils from the union pieces $s\ t\ u$ at the top and the corresponding union pieces $s'\ t'\ u'$ at the bottom that the coils may be withdrawn through any door (not shown) in the air-heating chamber. The coils may be removed together or one by one. The heating-chamber is preferably formed of sheet-iron or other sheet metal formed into a cylinder 5, and around this cylinder 5 is an outer concentric cylinder 6. The annular space between these two cylinders forms an air-jacket. Air can enter and leave this jacket by small holes 7 and 8 at the bottom and top of the jacket, respectively; but these holes are made so small that there is very little circulation of air in the jacket. There is only sufficient circulation to prevent the air from getting overheated. This air-jacket absorbs the heat radiated from the cylinder 5. The outer cylinder 6 and the conical top and bottom ends of the air-heating chamber may be lagged with slag-wool, asbestos, or other suitable material 9, which is a bad conductor of heat. An outer casing preferably surrounds the non-conducting material 9.

A modified arrangement of coils for my air-heating chamber is shown in Figs. 3 and 4. In this form and arrangement of coils I construct the coils in spirals or helices, so as to form three skeleton cylinders or tiers; but instead of having only one coil in each cylinder, as was the case in my first-described arrangement, I now in this modified form place an unequal number of coils in each cylinder. For example, as illustrated in Figs. 3 and 4, I may place three coils $p\ p'\ p^2$ to form the outer cylinder or tier, two coils $q$ and $q'$ to form the intermediate cylinder or tier, and one coil $r$ to form the inner cylinder or tier. The three outer coils are therefore similar to the threads of a triple-threaded screw and the two intermediate coils to the threads of a double-threaded screw. I maintain the distance between the adjacent convolutions the same or nearly the same in all three cylinders or tiers; but by my device of having three coils in the outer tier, two in the intermediate tier, and one in the inner tier I can have the same amount of superficial area in all my coils and also have the sections of the coils the same. In this modified form of my invention the coils are connected, as in the form of my invention first described, to the pipes $e$ and $f$, extending from the water-heater.

Another modified arrangement of coils is shown in Figs. 5 and 6. In this case the coils are in the form of zigzags instead of in helices. The pitch of the zigzags is made constant in all the coils, and it will therefore be obvious that the lengths of all the coils are not the same, but will diminish from the center coil to the end coils. The diameters of the coils are therefore proportioned to their lengths, so that the superficial area of each is proportional to the amount of water passing through it in a given time.

Having now described my invention, what I claim as new, and desire to secure by Letters Patent, is—

1. In apparatus for heating and ventilating buildings in combination, a cylindrical air-heating chamber, vertical coils of piping of equal pitch situated in said air-heating chamber, the sections of the coils being so proportioned to their lengths as to make the superficial area of each coil proportional to its capacity, and means for moistening the air in said air-heating chamber, substantially as described.

2. In apparatus for heating and ventilating buildings, in combination, a cylindrical air-heating chamber, coils of pipe arranged in concentric vertical helices in and coaxial with the said chamber, the pitch of convolutions of all the coils being equal and the sections of the coils being so proportioned to their lengths as to make the superficial area of each coil proportional to its capacity, substantially as described.

In witness whereof I have hereunto set my hand in presence of two witnesses.

ISAAC SHIMWELL McDOUGALL.

Witnesses:
VIVIAN ARTHUR HUGHES,
ROBERT MORRISON NEILSON.